US006974387B1

(12) United States Patent
Houis et al.

(10) Patent No.: US 6,974,387 B1
(45) Date of Patent: Dec. 13, 2005

(54) BLOW-MOLDED ARTICLES AND BLOW-MOLDING METHODS FOR PRODUCING THEM

(75) Inventors: Jacques Houis, Thouaré-sur-Loire (FR); Yann Lelievre, La Chapelle-Basse-Mer (FR); Rémi Boyen, Nantes (FR)

(73) Assignee: Draftex Industries Limited, Edinburgh (GB)

( * ) Notice: Subject to any disclaimer, the term of this patent is extended or adjusted under 35 U.S.C. 154(b) by 775 days.

(21) Appl. No.: 09/645,777

(22) Filed: Aug. 25, 2000

(30) Foreign Application Priority Data

Jan. 5, 2000 (GB) .................................... 0000102

(51) Int. Cl.[7] ................................................ F16D 3/84
(52) U.S. Cl. .................... 464/175; 277/926; 285/132.1
(58) Field of Search ............................ 285/21.1, 145.5, 285/285.1, 226, 132.1, 133.6, 133.11; 464/17, 464/173, 175; 277/634–636, 926, 928; 74/422; 180/428; 138/26; 220/495.05

(56) References Cited

U.S. PATENT DOCUMENTS

| | | | | |
|---|---|---|---|---|
| 390,821 A | * | 10/1888 | Thomas | 285/285.1 X |
| 913,036 A | * | 2/1909 | Nelson | 285/285.1 X |
| 1,437,130 A | * | 11/1922 | Chandler | 464/173 X |
| 1,912,993 A | * | 6/1933 | Murray, Jr. | 285/21.1 X |
| 2,652,172 A | * | 9/1953 | Carmine | 220/495.05 |
| 3,167,210 A | * | 1/1965 | Carney, Jr. | 220/495.05 |
| 3,655,224 A | * | 4/1972 | Carberry et al. | 285/226 X |
| 4,515,842 A | * | 5/1985 | Kovacs | |
| 4,779,880 A | * | 10/1988 | Hyodo | 74/422 X |
| 5,236,204 A | | 8/1993 | Hempel | |
| 6,328,498 B1 | * | 12/2001 | Mersch | 277/636 X |

FOREIGN PATENT DOCUMENTS

| | | | |
|---|---|---|---|
| EP | 0 144 450 | | 6/1985 |
| EP | 0 302 117 | | 2/1989 |
| GB | 1 021 974 | | 3/1966 |
| GB | 1 405 061 | | 9/1975 |
| JP | 6-285963 | | 11/1984 |
| JP | 59199219 | | 11/1984 |
| JP | 59-199219 | | 12/1984 |
| JP | 5-185491 | * | 7/1993 |
| JP | 06285963 | | 10/1994 |
| SU | 504662 | | 2/1976 |

OTHER PUBLICATIONS

Automotive Engineering International, AEI, Aug. 2003, p. 35.*

* cited by examiner

*Primary Examiner*—Greg Binda
(74) *Attorney, Agent, or Firm*—Leydig, Voit & Mayer, Ltd

(57) ABSTRACT

A flexible bellows, such as for protecting the end of a longitudinally movable steering rack, has a hollow connector mounted on it adjacent its larger diameter fixing collar. The connector enables a connection to be made from the interior of the bellows through a similar connector on a second bellows covering the opposite end of the rack and thus to the interior of the second bellows. As the rack moves to and fro, compressing one bellows and expanding the other, the increased pressure in the compressed bellows is automatically transferred to the expanded bellows. The connector is pre-produced, such as from relatively rigid material by a moulding operation, and then placed in the mould which is used for producing the bellows. A parison or preform of thermoplastics material is placed in the mould and then blown to form the bellows. This operation forces some of the blown material of the parison or preform into the open end of the connector, which at the same time secures the connector to the bellows and forms an opening through the wall of the bellows to connect the interior of the bellows to the interior of the connector.

8 Claims, 2 Drawing Sheets

BLOW-MOLDED ARTICLES AND BLOW-MOLDING METHODS FOR PRODUCING THEM

BACKGROUND OF INVENTION

The invention relates to blow-moulded articles and blow-moulding methods for producing them. Articles embodying the invention and to be described in more detail below are bellows arrangements for protecting moving parts in the mechanism of motor vehicles.

BRIEF SUMMARY OF THE INVENTION

According to the invention, there is provided an article produced by blow-moulding of a parison or preform, and including a separate element having an opening, the separate element being joined to the parison or preform during blowing of the parison or preform, and in which the blown material of the parison or preform enters the opening and is itself formed with an opening during and by blowing of the parison or preform so that the interior of the article is in communication with the interior of the separate element.

According to the invention, there is further provided a flexible bellows arrangement made of thermoplastics material by blow-moulding a parison or preform and having a connector element with a hollow passage therethrough which is secured at a predetermined position to the wall of the bellows to enable a connection to be made to the interior of the bellows through its wall, the connector element being sealed and secured in position by blow-moulded material of the parison or preform which has entered the hollow passage of the connector element to weld the material of the parison or preform to the material of the connector element and to form an opening through the material of the parison or preform which communicates with the hollow passage.

According to the invention, there is also provided a method of securing a separate element having an opening therein to the wall of an article which is produced by blowing a parison or preform, comprising the steps of separately producing the separate element, placing it in a mould which receives the parison or preform, and blowing the parison or preform in the mould so that material of the parison or preform enters the opening of the separate element and secures the element to the article, the blowing of the material of the parison or preform into the opening of the separate element forming an aperture in the parison or preform at that position whereby to form a communication between the interior of the article and the opening of the separate element.

In embodiments of the invention to be described, therefore, connector elements can easily be sealingly welded to products such as bellows made by extrusion blow-moulding or injection blow-moulding.

DESCRIPTION OF THE DRAWINGS

Bellows arrangements embodying the invention will now be described, by way of example only, with reference to the accompanying diagrammatic drawings in which.

DESCRIPTION OF PREFERRED EMBODIMENTS

Figure 1:
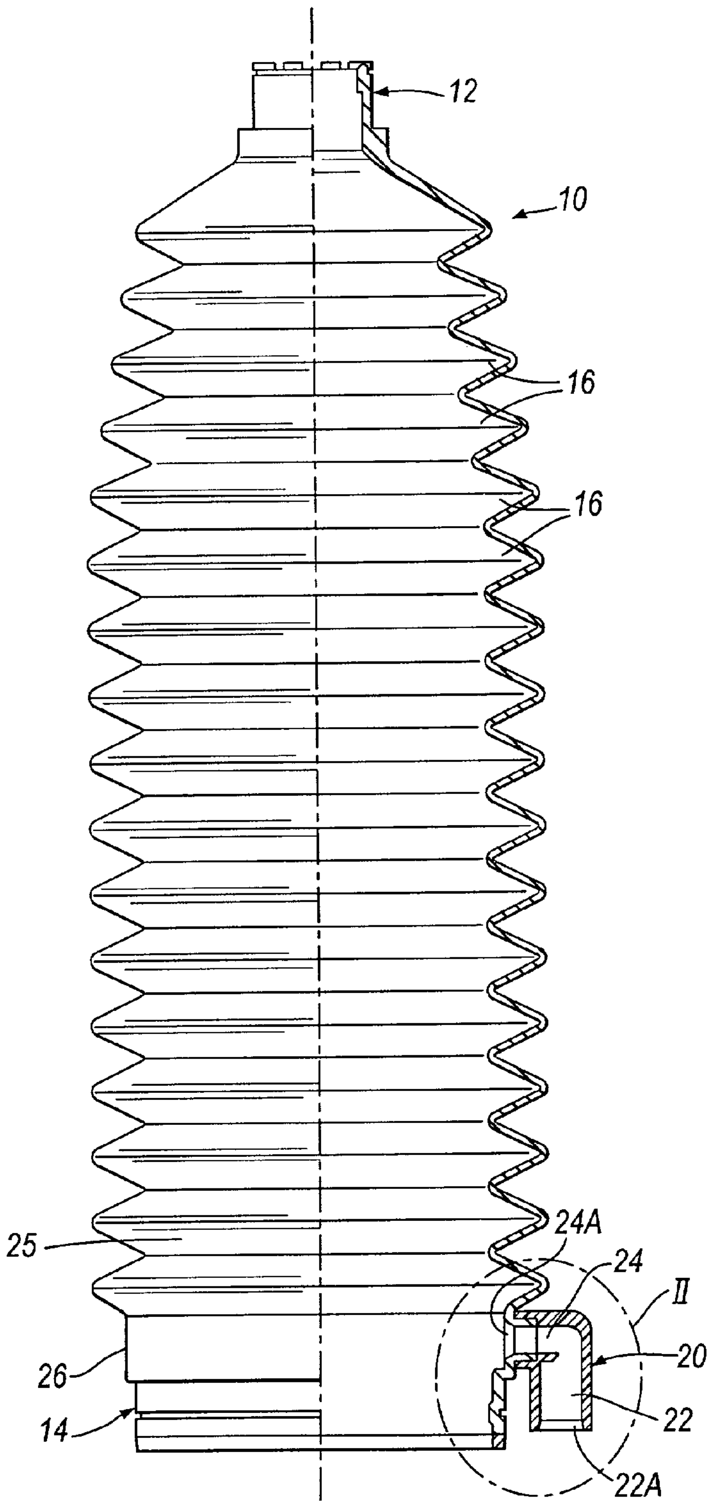
FIG. 1 is a cross-section through one of the bellows arrangements.
Figure 2:
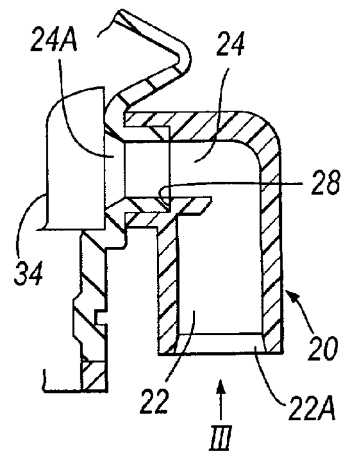
FIG. 2 is an enlarged view of the portion of FIG. 1 shown at II.

The bellows arrangement 10 shown in FIGS. 1 and 2 comprises a small diameter fixing collar 12 at one end and a larger diameter fixing collar 14 at the opposite end, with a plurality of bellows turns 16 integrally extending between the two collars. In use, the fixing collars 12 and 14 are used to attach the bellows to two relatively movable parts of a mechanism (not shown) which is to be protected in a motor vehicle. The collars 12 and 14 may be fixed to different parts of the mechanism by suitable circumferentially extending clamping rings. The bellows protects the mechanism from ingress of water, dirt and other contamination.

In one particular application of the bellows 10, two of them are respectively mounted to protect the ends of a steering rack of the steering mechanism on the vehicle. Thus, the steering mechanism may comprise a steering box operated directly by the driver's steering wheel or through the intermediary of a power steering arrangement. A steering rack extends outwardly in opposite directions from each side of the steering box 30 and is moved axially in one or the other direction by the steering box 30, in response to steering action by the driver, the opposite ends of the rack being connected to turn the steerable wheels 32 of the vehicle. In use, a bellows 10 extends from one side of the steering box, with its larger diameter fixing collar 14 being secured to the steering box where the 30 steering rack extends outwardly therefrom. The smaller diameter collar 12 of the bellows 10 is secured to the distal end of the rack.

At the opposite side of the steering box, from which the second end of the rack protrudes, a second bellows 10 is secured, with its smaller diameter collar 12 fixed to that distal end of the steering rack.

The two bellows bellows 10 thus protect the two end portions of the rack and flexibly accommodate the axial movement of the bellows.

As the rack moves to and fro, in order to carry out desired steering action, the two bellows 10 will be alternately compressed and expanded. It is therefore necessary to accommodate the resultant changes in pressure in the two bellows. If this is not done, excessive pressure may rupture the bellows. In order to deal with this problem, it is known to interconnect the interiors of the two bellows. In this way, when one bellows is contracted by movement of the rack, the increased pressure within the bellows is transmitted to the interior of the other bellows which will at the same time be expanded.

In accordance with a feature of the bellows being described, this interconnection between the two bellows at opposite ends of the steering rack is implemented by means of an interconnection tube 34 (not shown) which extends sealingly between two connectors 20 (of which one is shown at 20 in FIGS. 1 and 2). The connector 20 is L-shaped in form, comprising in greater detail, a relatively long hollow tubular part 22 and a relatively short hollow tubular part 24. Each part of 22,24 has an open end 22A, 24A. As shown in FIGS. 1 and 2, the connector 20 is secured in position on the bellows 10 so that the end of 24A is attached to the wall of the bellows adjacent the larger diameter collar 14 and with the hollow interior of the portion 24 thus open to the interior 25 of the bellows. The portion 24 of the connector 20 thus extends radially of the axis of the bellows and the portion 22 of the connector extends in an axial direction.

The connector 20 of the bellows 10 at the other end (not shown) of the steering rack is mounted similarly on that bellows, and the two ends 22A of the connectors are interconnected by the interconnection tube (not shown) which is preferably rigid and fits inside the hollow tubular parts 22 of the connectors 20 of the two bellows.

The bellows of the form shown in the figures need to be produced in large quantities using mass-production techniques. A parison or preform of thermoplastic material in a suitable mould is blown to produce the bellows (for simplicity, the term "parison" will be used alone in the following description and in the claims but is intended to include "preform" where injection blow-moulding is used). It is desirable that the connector 20 be secured to the bellows 10 in an efficient manner, necessitating the minimum number of operations. In accordance with a feature of the bellows being described, the connector 20 is separately produced, such as from relatively stiff thermoplastics material by a suitable moulding operation. It is then placed in the mould which is used for blow-moulding the bellows 10. The parison of thermoplastics material is formed in the interior of this mould and then blown internally to produce the form of the bellows. This blowing action blows the material of the parison into the end 24A of the portion 24 of the connector 20 and thus sealingly secures the parison to the connector 20 by welding the material of the parison to the material of the connector 20. Simultaneously, a hole is formed through a circular wall portion 26 of the parison by the blowing operation which thus connects the interior 25 of the bellows to the interior of the connector 20, all as shown in FIG. 2.

The connector 20 is very firmly secured to the parison. The welding operation forms a very strong welded bond between the material of the connector 20 and the material of the parison. In addition, a mechanical bond is formed between the connector and the parison by the material of the parison where it enters the end 24A of the connector 20.

The arrangement described and illustrated herein is therefore advantageous over known arrangements in which connectors similar to the connector 20 are mounted on the bellows by a glueing operation, which is complex, requiring several different operations including the formation of a hole through the wall of the bellows. The arrangement described and illustrated herein is also advantageous over arrangements in which the connector 20 is moulded integrally with the bellows. Such arrangements are complex because it is necessary to carry out a separate operation to form a hole through the wall of the bellows. In the arrangement described and illustrated herein, the only condition that the materials of the tubular part 24 and the parison have to satisfy is chemical compatibility. This enables various modifications to be easily made. For example, the connector 20 could be relatively stiff, and the interconnection tube (for connecting the connectors 20 of the two bellows) could be flexible. However, other modifications are also possible.

The arrangement illustrated is advantageous in that the connector 20 can be very precisely located relative to the wall of the bellows, because it is positioned within the mould itself, or it can be very precisely located relative to the blown part of the wall of the bellows in the case where the bellows is only partially blown.

As shown in FIG. 2, the end 24A of the connector portion 24 can be formed with a circular recess 28 for receiving the material of the parison as it is blown into the end 24A.

Figure 3:
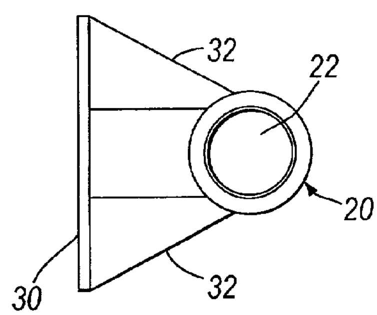
FIG. 3 is an end view of part of a connector shown in FIG. 2, looking in the direction of the arrow III.
Figure 4:
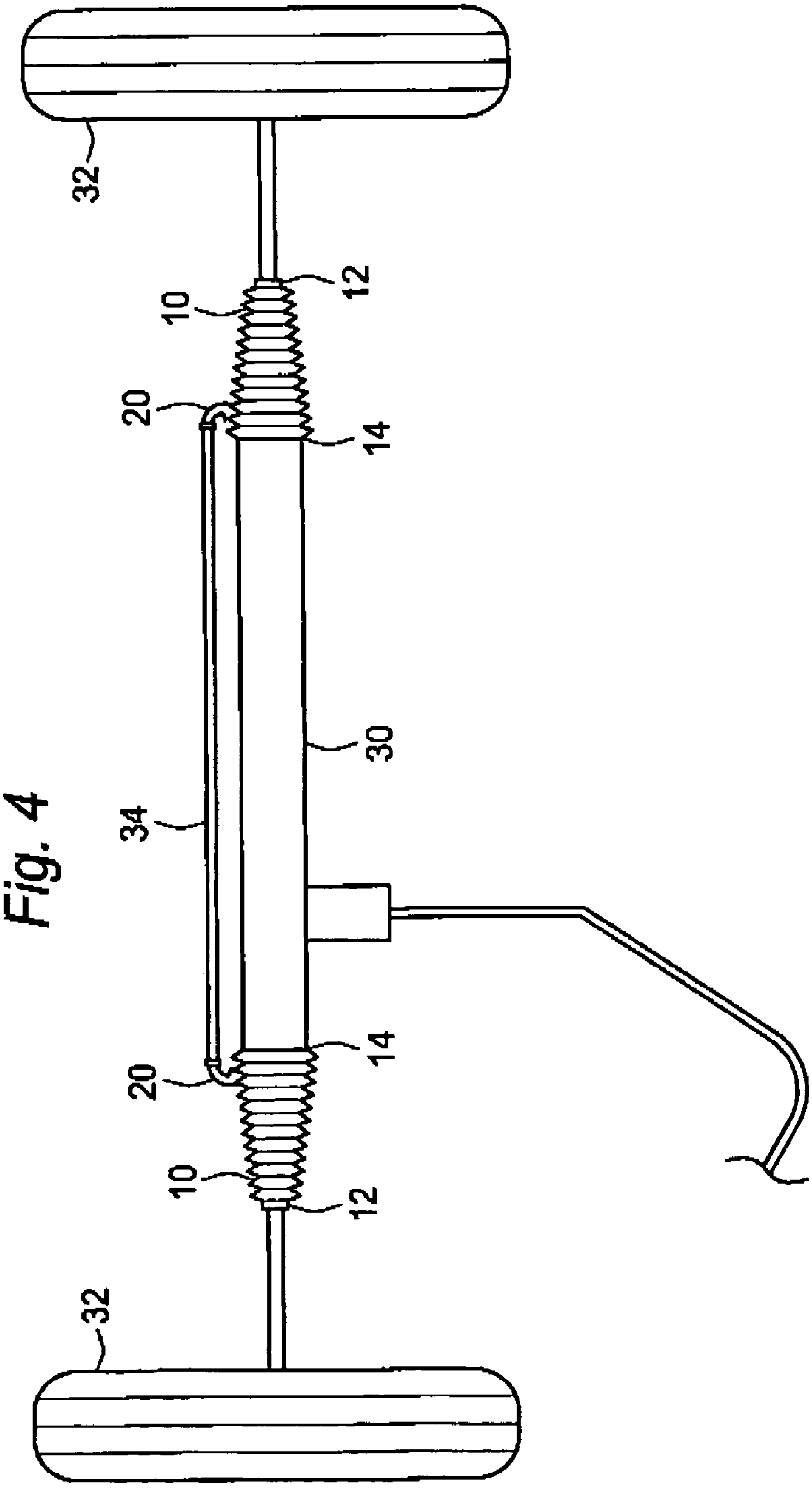
FIG. 4 is a bellows arrangement comprising a pair of bellows.

FIG. 3 shows an end view of the connector 20, viewed in the direction of the arrow III of FIG. 2, before it is positioned in the mould. It has a base 30 and ribs 32,32 which support the tubular parts 22,24. The blowing operation which blows the parison into the form of the bellows is thus arranged to produce a small flat area in the generally circular wall portion 26. The base 30 (FIG. 3) of the connector 20 is received on the outside of this flat area. On the inside of the bellows, the inside surface of this flat area merges into the inside of the circular wall portion 26 as shown at 34 (in FIG. 2 but not in FIG. 1).

It will be appreciated that the connector 20 can be situated at any desired position on the external wall of the bellows. The connector 20 can have any desired rigidity.

Although the above description explains how a connector 20 can be secured to the wall of a bellows 10, it will be appreciated that the same process can be used in many other applications where it is desired to attach a connector or other part having an opening, to the external surface or wall of a part which is produced by a blow moulding operation.

What is claimed is:

1. A flexible bellows arrangement comprising a parison of blow-molded thermoplastic material comprising a wall defining an interior, and an opening in said wall into the interior, and a connector element with a hollow passage therethrough communicating with said opening to enable a connection to be made to the interior through said wall, the connector element being of a hollow tubular form, the connector element being secured in position by a portion of the material of the parison which has entered the hollow passage of the connector element to weld and seal the material of the parison to the material of the connector element and to form said opening during the blow-molding of the parison, wherein the parison comprises an axis and the connector element comprises a first hollow tubular portion extending generally radially of the parison and a second integral hollow tubular portion extending parallel to the axis of the parison.

2. A bellows arrangement according to claim 1, in which the connector element is made of molded thermoplastic material.

3. A bellows arrangement comprising a first bellows arrangement comprising a parison of blow-molded thermoplastic material comprising a wall defining an interior, and an opening in said wall into the interior, and a connector element with a hollow passage therethrough communicating with said opening to enable a connection to be made to the interior through said wall, the connector element being secured in position by a portion of the material of the parison which has entered the hollow passage of the connector element to weld and seal the material of the parison to the material of the connector element and to form said opening during the blow-molding of the parison, in combination with a second bellows arrangement according to claim 2, the interiors of the two bellows arrangements being connected together by means of their connector elements.

4. A bellows arrangement comprising a first bellows arrangement comprising a parison of blow-molded themoplastic material comprising a wall defining an interior, and an opening in said wall into the interior, and a connector element with a hollow passage therethrough communicating with said opening to enable a connection to be made to the interior through said wall, the connector element being secured in position by a portion of the material of the parison which has entered the hollow passage of the connector element to weld and seal the material of the parison to the material of the connector element and to form said opening during the blow-molding of the parison, in combination with a second bellows arrangement according to claim 1, the interiors of the two bellows arrangements being connected together by means of their connector elements.

5. A flexible bellows arrangement comprising, in combination, first and second bellows arrangements, each said bellows arrangement comprising, a parison of blow-molded thermoplastic material comprising a wall defining an interior, and an opening in said wall into the interior, and a connector element with a hollow passage therethrough communicating with said opening to enable a connection to be made to the interior through said wall, the connector element being secured in position by a portion of the material of the parison which has entered the hollow passage of the connector element to weld and seal the material of the parison to the material of the connector element and to form said opening during the blow-molding of the parison, the interiors of the two bellows arrangements being connected together by means of their connector elements.

6. A bellows arrangement comprising a first bellows arrangement in combination with a second bellows arrangement, the first and second bellows arrangements each comprising a parison of blow-molded thermoplastic material comprising a wall defining an interior, and an opening in said wall into the interior, and a connector element with a hollow passage therethrough communicating with said opening to enable a connection to be made to the interior through said wall, the connector element being secured in position by a portion of the material of the parison which has entered the hollow passage of the connector element to weld and seal the material of the parison to the material of the connector element and to form said opening during the blow-molding of the parison, at least the connector element of the second bellows arrangement being made of molded thermoplastic material, the interiors of the two bellows arrangements being connected together by means of their connector elements.

7. A bellows arrangement comprising a first bellows arrangement in combination with a second bellows arrangement, the first and second bellows arrangements comprising a parison of blow-molded thermoplastic material comprising a wall defining an interior, and an opening in said wall into the interior, and a connector element with a hollow passage therethrough communicating with said opening to enable a connection to be made to the interior through said wall, the connector element being secured in position by a portion of the material of the parison which has entered the hollow passage of the connector element to weld and seal the material of the parison to the material of the connector element and to form said opening during the blow-molding of the parison, at least the connector element of the second element being of a hollow tubular form, the interiors of the two bellows arrangements being connected together by means of their connector elements.

8. A bellows arrangement comprising a first bellows arrangement and a second bellows arrangement, the first and second bellows arrangements each comprising a parison of blow-molded thermoplastic material comprising a wall defining an interior, and an opening in said wall into the interior, and a connector element with a hollow passage therethrough communicating with said opening to enable a connection to be made to the interior through said wall, the connector element being secured in position by a portion of the material of the parison which has entered the hollow passage of the connector element to weld and seal the material of the parison to the material of the connector element and to form said opening during the blow-molding of the parison, wherein at least the connector element of the second bellows arrangement is of a hollow tubular form and made of molded thermoplastic material, the interiors of the two bellows arrangements being connected together by means of their connector elements.

* * * * *